W. T. QUINN.
Fishing, and Similar Floats.
No. 165,867.                                           Patented July 20, 1875.
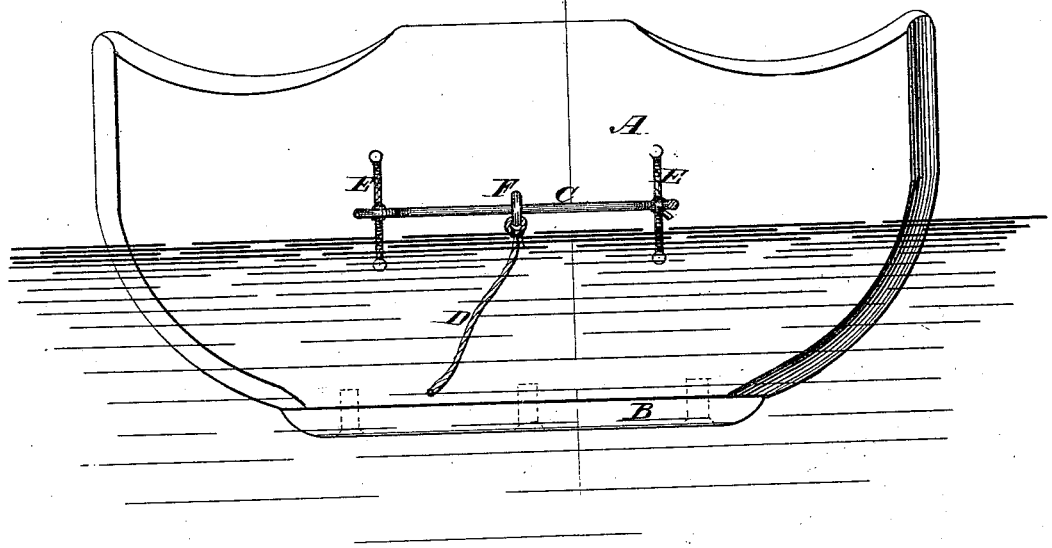
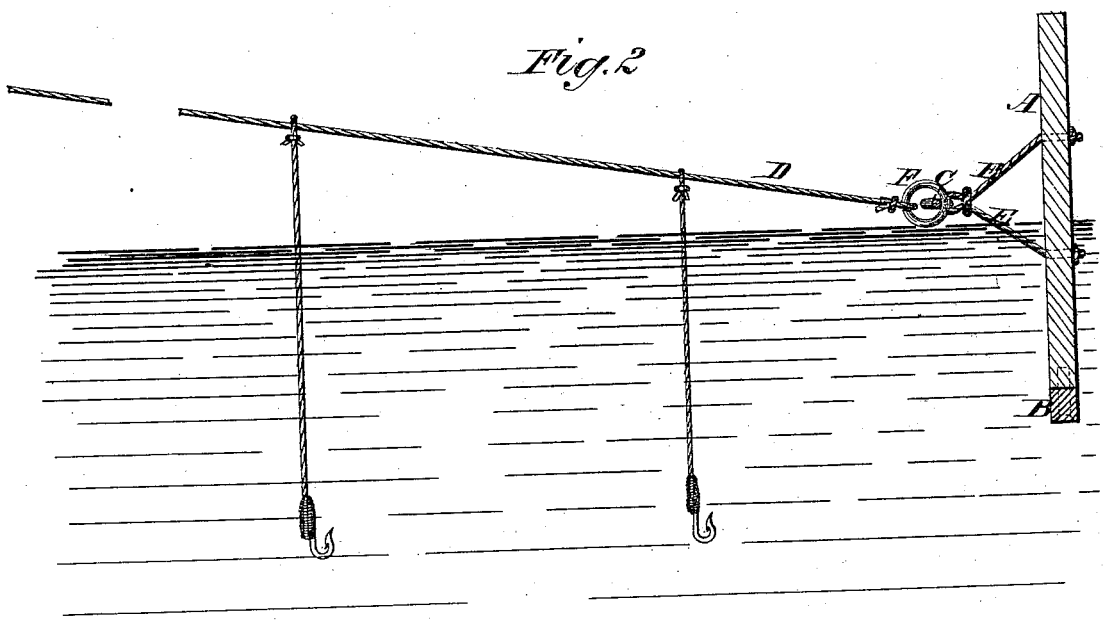
WITNESSES:
Francis McArdle.
A. F. Terry
INVENTOR:
W. T. Quinn
BY
ATTORNEYS.

UNITED STATES PATENT OFFICE.

WILLIAM T. QUINN, OF PATERSON, NEW JERSEY, ASSIGNOR OF TWO-THIRDS HIS RIGHT TO WILL HAGUE AND JOHN HAGUE, OF SAME PLACE.

IMPROVEMENT IN FISHING AND SIMILAR FLOATS.

Specification forming part of Letters Patent No. 165,867, dated July 20, 1875; application filed June 5, 1875.

*To all whom it may concern:*

Be it known that I, WILLIAM T. QUINN, of Paterson, in the county of Passaic and State of New Jersey, have invented a new and Improved Fishing and Life-Saving Float, of which the following is a specification:

My invention consists of a float contrived to run deep in the water, and have considerable side draft, with a rod along one side, to which a cord for drawing the float is attached by a ring, so that it will shift from end to end of the rod freely, according to which end of the float the draft is to be applied, to thus enable the float to be run out readily from the shore, and then be drawn forward and backward at the limit of the line, as a means of carrying fishing-lines or running out the float to persons in distress, or to operate a decoy-duck.

Figure 1 is a side elevation of my improved float, and Fig. 2 is a transverse section of Fig. 1 on line $x\ x$.

Similar letters of reference indicate corresponding parts.

A is the float, which in this example consists of a board with one edge loaded with lead B, to cause it to float edgewise in the water, but it may be of any suitable contrivance as to form and construction. C is the attaching-rod for the draft-line D. It is attached to one side by cords E, and the draft-line D is connected to it by the ring F, so as to shift from end to end of the rod, according to which way the float is to be drawn. The rod C is sufficiently shorter than the float to give the necessary side draft to the latter, and the connection of the draft-cord to it is such as to shift readily from one end to the other.

The rod may be attached to the board by rigid bars or wires, instead of the cords, if preferred; but the cords are probably best, as they allow the rod to fold down snugly on the board when out of the water.

The float may be constructed in the shape of a decoy-duck, to be used as such, if desired.

Having thus described my invention, I claim as new and desire to secure by Letters Patent—

The combination of a draft-line, D, and an attaching-rod, C, with a float, A, when constructed and arranged substantially in the manner described.

WILLIAM THOMAS QUINN.

Witnesses:
 WILL HAGUE,
 JOHN AVISON.